United States Patent
Brooks et al.

(10) Patent No.: US 10,106,720 B2
(45) Date of Patent: *Oct. 23, 2018

(54) METHODS AND COMPOSITIONS FOR USING TEMPORARY, SLOW DEGRADING, PARTICULATE AGENTS IN A SUBTERRANEAN FORMATION

(71) Applicant: MAGNABLEND INC., Waxahachie, TX (US)

(72) Inventors: Amy Lyn Brooks, Waxahachie, TX (US); Raynard Rene Veldman, Mansfield, TX (US); Bradley Leon Todd, Duncan, OK (US)

(73) Assignee: Magnablend, Inc., Waxahachie, TX (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/187,372

(22) Filed: Jun. 20, 2016

(65) Prior Publication Data

US 2016/0298021 A1   Oct. 13, 2016

Related U.S. Application Data

(62) Division of application No. 14/337,762, filed on Jul. 22, 2014, now Pat. No. 9,394,474.

(60) Provisional application No. 61/863,196, filed on Aug. 7, 2013.

(51) Int. Cl.

| | |
|---|---|
| *C09K 8/035* | (2006.01) |
| *C09K 8/516* | (2006.01) |
| *C09K 8/60* | (2006.01) |
| *C09K 8/62* | (2006.01) |
| *E21B 21/00* | (2006.01) |
| *E21B 29/00* | (2006.01) |
| *E21B 33/138* | (2006.01) |
| *E21B 43/04* | (2006.01) |
| *E21B 43/114* | (2006.01) |
| *E21B 43/26* | (2006.01) |
| *E21B 43/267* | (2006.01) |
| *C09K 8/42* | (2006.01) |
| *C09K 8/54* | (2006.01) |
| *C09K 8/56* | (2006.01) |
| *C09K 8/74* | (2006.01) |

(52) U.S. Cl.

CPC ............. *C09K 8/516* (2013.01); *C09K 8/035* (2013.01); *C09K 8/426* (2013.01); *C09K 8/54* (2013.01); *C09K 8/56* (2013.01); *C09K 8/605* (2013.01); *C09K 8/62* (2013.01); *C09K 8/74* (2013.01); *E21B 21/003* (2013.01); *E21B 29/00* (2013.01); *E21B 33/138* (2013.01); *E21B 43/04* (2013.01); *E21B 43/114* (2013.01); *E21B 43/26* (2013.01); *E21B 43/267* (2013.01); *C09K 2208/18* (2013.01); *C09K 2208/32* (2013.01)

(58) Field of Classification Search
CPC .......... C09K 8/035; C09K 8/22; C09K 8/506; C09K 8/68; C09K 8/575; C09K 8/86
USPC ........................................................ 507/200
See application file for complete search history.

(56) References Cited

U.S. PATENT DOCUMENTS

| | | | |
|---|---|---|---|
| 2,280,994 A | 4/1942 | Booth et al. | |
| 2,562,867 A | 7/1951 | Kurtz et al. | |
| 2,649,159 A * | 8/1953 | Boyer | .................... C09K 8/516 |
| | | | 166/295 |
| 3,816,148 A * | 6/1974 | Barthel | .................. C04B 28/32 |
| | | | 106/684 |
| 4,062,890 A | 12/1977 | Shank | |
| 4,387,769 A | 6/1983 | Erbstoesser et al. | |
| 5,021,247 A | 6/1991 | Moore | |
| 5,080,809 A | 1/1992 | Stahl et al. | |
| 6,059,034 A | 5/2000 | Rickards et al. | |
| 6,896,058 B2 | 5/2005 | Munoz, Jr. et al. | |
| 6,983,798 B2 | 1/2006 | Todd | |
| 7,044,220 B2 | 5/2006 | Nguyen et al. | |
| 7,281,583 B2 | 10/2007 | Whitfall et al. | |
| 7,775,278 B2 | 8/2010 | Willberg et al. | |
| 2005/0230112 A1 | 10/2005 | Reddy et al. | |
| 2011/0187556 A1 | 8/2011 | Roddy et al. | |
| 2012/0138303 A1 | 6/2012 | Welton et al. | |

OTHER PUBLICATIONS

Koivunen, Marja E., et al., "Isolation of a strain of Agrobacterium tumefaciens (*Rhizobium radiobacter*) utilizing methylene urea (ureaformaldehyde) as nitrogen source," *Can. J. Microbiol.* 50:167-174 (2004).

\* cited by examiner

*Primary Examiner* — Aiqun Li
(74) *Attorney, Agent, or Firm* — Brinks Gilson & Lione

(57) ABSTRACT

Methods, fluids, and compositions are provided for treating subterranean formations. The fluids can be servicing or drilling fluids including a base fluid and a particulate agent or biocide precursor particulate agent. The particulate agent can seal flow paths in the subterranean formation and subsequently can be degraded to allow flow to resume. The particulate agent may be a reaction product of a urea containing compound and an aldehyde containing compound. An example of such a reaction product is a methylene urea.

7 Claims, No Drawings

METHODS AND COMPOSITIONS FOR USING TEMPORARY, SLOW DEGRADING, PARTICULATE AGENTS IN A SUBTERRANEAN FORMATION

BACKGROUND

1. Field of the Invention

The present disclosure generally relates to compositions, fluids, and methods for treating subterranean formations. More particularly, the present disclosure relates to drilling and servicing fluids comprising particulate agents, which may also be biocide precursors, and methods for treating subterranean formations using such fluids.

2. Description of the Related Art

In the oil and gas, water well, and injection well industries, boreholes are drilled into subterranean formations and certain fluids may then be introduced therein. The fluids can flow through vugs, pore spaces, and natural or manmade fractures in the formations. Additional flow paths in the formations may also exist. For example, fluid can flow through the wellbore, a well casing, perforation tunnels, slots, tubing, annuli, washouts, particulate packs, screens and completion, service, or workover equipment.

During the producing (or injecting) phase of a well, it is generally desirable to have the subterranean formation as free flowing as possible or at a rate set by the design of the well. However, during the drilling, completion, or workover phases, it may be desirable to allow various fluids to flow into only a portion of the formation or wellbore while preventing it from flowing into other portions. Particulate material has been employed to bridge/seal/plug certain flow paths in the formations where the flow of fluids is undesirable. The different materials that have been used historically for these purposes can generally be classified as permanent, removable, or temporary.

Examples of commonly used permanent materials are sand, clay, barite, and a number of different waste stream materials, such as fly ash. Although these materials function to control fluid flow/loss at the time of use, they have a severe residual effect on the production or injection of the well later in time. An example of a removable material is calcium carbonate. After the calcium carbonate has been used to modify flow, a cleanup solution, such as an acid, will need to be injected to contact the calcium carbonate and remove it from the flow paths. Examples of temporary materials are those that degrade, decompose, or have gradual solubility in the wellbore fluid. Biodegradable polymers, such as polylactic acid, are commonly used since they degrade in the presence of small amounts of water. However, these polymers have temperature and cost limitations that prohibit their use in many wellbore applications. Further, decomposition of these materials does not lead to the formation of any particularly useful products, such as biocides.

During the drilling and completing of oil and gas wells, precautions must be taken to prevent the introduction of significant numbers of sulfate reducing bacteria (SRB) into the zone. These bacteria can grow in population in fluids that contain food sources for them, generally sulfate sources (ex: lignosulfonates, gypsum) and certain organic materials (ex: polysaccharides). The bacteria can be easily picked up in seawater and in water from retaining ponds. Placement of a fluid containing SRB's downhole can generate two conditions favorable to population growth. The first is a reduced oxygen environment (anaerobic). SRB's are common anaerobic bacteria. The second is the additional sources of sulfate and sulfite that can be found in some formations. Under these conditions the SRB's convert the sulfate (or sulfide) into sulfide, generally as the gas "hydrogen sulfide." Oil or natural gas that contains hydrogen sulfide ($H_2S$) gas is referred to as "sour." Because of the additional cost of refining hydrocarbons containing $H_2S$, the crude oil/natural gas from these reservoirs have a reduced value. In addition, the presence of these bacteria and their byproducts can reduce the production capability of a field.

A third issue is the reaction of $H_2S$ with steel, causing corrosion that can lead to significant mechanical problems with well and production equipment. Given how easy it is to have these bacteria contaminate oil field fluids and the commercial damage they can cause, additives to prevent the bacteria population from growing can be highly desirable.

BRIEF SUMMARY

Compositions, fluids, and methods for treating subterranean formations are disclosed herein. In one aspect, a method for treating a subterranean formation is provided. The method comprises the step of providing a servicing fluid comprising a base fluid and an effective amount of a solid particulate agent suspended therein. The solid particulate agent is a reaction product of a urea containing compound and an aldehyde containing compound. The method also comprises the steps of introducing the servicing fluid into the subterranean formation, allowing at least a portion of the solid particulate agent to seal a flow path in the subterranean formation, and degrading at least a portion of the solid particulate agent.

In another aspect, a method for treating a subterranean formation having a pre-existing wellbore is provided. The method comprises the step of providing a servicing fluid comprising a base fluid and an effective amount of a particulate agent. The particulate agent is a reaction product of a urea containing compound and an aldehyde containing compound. The method also comprises the steps of introducing the servicing fluid into the subterranean formation, allowing at least a portion of the particulate agent to seal a flow path in the subterranean formation, and degrading at least a portion of the particulate agent.

In an additional aspect, a servicing fluid is provided. The servicing fluid comprises a base fluid and a solid particulate agent. The base fluid is selected from the group consisting of water, an aqueous fluid comprising salt, an oil, an ester, a non-aqueous solvent, a gas, and any combination thereof. The solid particulate agent is a reaction product of a urea containing compound and an aldehyde containing compound.

In a further aspect, a method for treating a subterranean formation is provided. The method comprises the steps of providing a servicing fluid comprising a base fluid and an effective amount of a solid biocide precursor particulate agent suspended therein, wherein the solid biocide precursor particulate agent is a reaction product of a urea containing compound and an aldehyde containing compound; introducing the servicing fluid into the subterranean formation; and allowing at least a portion of the solid biocide precursor particulate agent to degrade, thereby forming a compound having biocidal properties.

In a further aspect, a method for treating a subterranean formation having a pre-existing wellbore is provided. The method comprises the steps of providing a servicing fluid comprising a base fluid and an effective amount of a biocide precursor particulate agent, wherein the biocide precursor particulate agent is a reaction product of a urea containing compound and an aldehyde containing compound; introducing the servicing fluid into the subterranean formation; allowing at least a portion of the biocide precursor particulate agent to seal a flow path in the subterranean formation; and degrading at least a portion of the particulate agent, thereby forming a compound having biocidal properties.

In another aspect, a servicing fluid is provided. The servicing fluid comprises a base fluid and a solid biocide precursor particulate agent, wherein the base fluid is selected from the group consisting of water, an aqueous fluid comprising salt, an oil, an ester, a non-aqueous solvent, a gas, and any combination thereof, and wherein the solid biocide precursor particulate agent is a reaction product of a urea containing compound and an aldehyde containing compound that, upon degradation, forms one or more compounds having biocidal properties.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

Not applicable.

DETAILED DESCRIPTION

Various embodiments are described below. The relationship and functioning of the various elements of the embodiments may better be understood by reference to the following detailed description. However, embodiments are not limited to those illustrated in the detailed description. It should be understood that in certain instances, details may have been omitted that are not necessary for an understanding of embodiments disclosed herein, such as conventional techniques or procedures used in the field or laboratory.

The present disclosure relates to drilling and servicing fluids (hereinafter "servicing fluids" or "fluids") and methods for treating subterranean formations. The fluids may comprise a base fluid and one or more temporary, slow-degrading, particulate agents (hereinafter referred to as "particulate agents" or "agents"). In some embodiments, the particulate agents may be biocide precursor particulate agents. Throughout this application, the terms "agent," "solid agent," "particulate agent," and the like may be intended to cover both particulate agents and biocide precursor particulate agents, which, in some embodiments, may be referring to the same compound, such as a reaction product of a urea containing compound and an aldehyde containing compound. Thus, a urea containing compound can be reacted with an aldehyde containing compound and the product of this reaction can be the particulate agent and/or biocide precursor particulate agent.

In some embodiments, the biocide precursor particulate agent may be placed in a subterranean formation, allowed to decompose/degrade, and thereafter generate one or more compounds having biocidal properties (e.g. the decomposition/degradation products (compounds) have biocidal properties).

In some aspects of the present disclosure, the particulate agent or biocide precursor particulate agent is a solid particulate agent suspended in the base fluid. In additional aspects, the particulate agent or biocide precursor particulate agent may be a solid particulate agent that is partially suspended in the base fluid and partially dissolved in the base fluid. A servicing fluid comprising a solid particulate agent or a solid biocide precursor particulate agent suspended therein is in direct contrast with a servicing fluid comprising a solution, or homogeneous mixture, of a particulate agent and a base fluid. In certain aspects, if the base fluid is an aqueous-based base fluid, the solid particulate agent or biocide precursor particulate agent can be water insoluble or substantially water insoluble. In other aspects, if the base fluid is not an aqueous-based base fluid, the solid particulate agents or biocide precursor particulate agents may be water soluble.

Although the reaction products of certain urea containing compounds and certain aldehyde containing compounds have restricted solubility in particular base fluids, and thus are present therein in solid or substantially solid form, in some aspects, these reaction products can eventually be chemically degraded or broken down over time by water present in the subterranean formation and, in some aspects, form one or more compounds having biocidal properties. Particular aldehyde containing and urea containing starting materials can be chosen, sometimes based upon their molecular weights, to give a desirable service life to the particulate agent. In accordance with the present disclosure, the solid particulate agents or solid biocide precursor particulate agents can also be formed to suitable sizes to provide them with the ability to effectively bridge/seal particular flow paths in the formation, such as pore throats or fractures. Also, particular concentrations of the particulate agents or biocide precursor particulate agents can be added to the base fluid to provide a servicing fluid that has the desired bridging/sealing properties.

The particulate agent or biocide precursor particulate agent (reaction product of a urea containing compound and an aldehyde containing compound) may be formed by a condensation reaction between the aldehyde and the urea, but the reaction products are not limited to products from condensation reactions and any known synthetic procedures can be used to react the aldehyde with the urea. For example, the synthetic process disclosed in U.S. Pat. No. 4,062,890, the contents of which are expressly incorporated into the present application in their entirety, may be used to manufacture the presently disclosed particulate agents or biocide precursor particulate agents.

The aldehyde containing compound may be selected from any known aldehyde containing compound. Illustrative, non-limiting examples of aldehyde containing compounds are formaldehyde, acetaldehyde, and isobutyraldehyde.

Any number of control factors may be utilized during the synthesis of the particulate agent or biocide precursor particulate agent, such as temperature, pH, pressure, and relative concentration, to control the molecular weight of the reaction product and the distribution of molecular weights. The particular aldehyde containing compound used and the molecular weight of the compound contribute to the rate of degradation of the reaction product, as well as its water solubility. For example, when the reaction product comprises methylene urea, lower molecular weight analogues, such as monomethylol urea and methylene diurea, may have high solubility in water and thus may not be useful as particulate agents, depending upon the desired application of the servicing fluid. Higher molecular weight methylene ureas, such as dimethylene triurea and trimethylene tetraurea, may have very limited water solubility even in hot water.

In some aspects, methylene urea compounds that may be used in accordance with the present disclosure are any methylene urea compound of the formula $(\text{methylene})_n(\text{urea})_{n+1}$, where n can be any number, such as 1, 2, 3, 4, 5, 6, 7, 8, 9, 10, 11, 12, etc. Additional illustrative, non-limiting examples of reaction products are isobutylidene diurea (IBDU) and crotonylidene diurea. Although some of these materials have been used as slow release fertilizers, relying on the breakdown of the material by microbial action to release a nitrogen source, the materials have not been applied in the oil and gas industry for the applications disclosed herein.

The present inventors have unexpectedly discovered that at the elevated temperatures encountered in subterranean formations, a degradation rate (in the absence of microbes) was observed that makes the particulate agents very useful in drilling and servicing fluids. Without wishing to be bound by any theory, degradation of the particulate agent may be caused by dissolution, decomposition, such as thermal decomposition, oxidative or reductive processes, and/or hydrolysis of the agent and the degradation rate may be influenced by the particular starting materials chosen to synthesize the reaction product, the molecular weight of the reaction product, the temperature inside of the subterranean formation, the concentration of the particulate agent in the servicing fluid, and/or the particle size distribution of the agents.

The degradation rate of the presently disclosed particulate agents may be a number of hours, such as about 1 to about 24 hours, about 1 to about 15 hours, about 1 about 8 hours, about 5 to about 24 hours, about 5 to about 15 hours, about 5 to about 8 hours, about 10 to about 24 hours, or about 10 to about 15 hours. In other aspects, the degradation rate of the presently disclosed particulate agents may be a number of days, such as about 1 to about 30 days, about 1 to about 20 days, about 1 to about 15 days, about 1 to about 10 days, about 1 to about 5 days, about 5 to about 30 days, about 5 to about 20 days, about 5 to about 15 days, about 5 to about 10 days, about 10 to about 30 days, about 10 to about 20 days, about 10 to about 15 days, about 15 to about 30 days, about 15 to about 20 days, or about 20 to about 30 days. Although exemplary ranges have been provided for the degradation rate of the particulate agents or biocide precursor particulate agents, the agents can be created such that they have degradation rates of any desired number of hours or any desired number of days, such as from about 30 days to about 90 days or from about 90 days to about 180 days.

The present inventors have also unexpectedly discovered that upon degradation/decomposition of the biocide precursor particulate agent, certain compounds are formed that have biocidal properties.

The shape of the solid particulate agent or solid biocide precursor particulate agent is not critical and thus the agent can be provided in any geometric form. Illustrative, non-limiting shapes of the agent are spheres, tablets, rods, plates, fibers, flakes, and cubes. Mixtures of shapes may also be used.

The size of the solid particulate agent or biocide precursor particulate agent can be chosen by one of ordinary skill in the art. Depending upon the application of the servicing fluid, the size may be chosen such that it will effectively bridge/seal a desired flow path in the subterranean formation, if the servicing fluid is being used for bridging/sealing applications. Depending upon the formation and the size of the opening to the flow path, a variety of different sized agents may be desired and one of ordinary skill will be aware of the various techniques that can be employed to control the size of the reaction products. For example, when dealing with natural or man-made fractures in the formation, particle sizes exceeding 1,000 microns may be desirable. For sealing pore throats of a permeable rock, the particle size may range from about 0.1 microns up to about 500 microns. Thus, in accordance with certain aspects of the present disclosure, solid particulate agents or solid biocide precursor particulate agents can have particle sizes ranging from about 0.1 microns to about 5,000 microns, including any sub-range thereof.

The particulate agent or biocide precursor particulate agent can have a variety of particle size distributions. For example, in some aspects, the size of the solid agent is from about 0.5 microns to about 300 microns, from about 1 micron to about 100 microns, from about 0.5 microns to about 50 microns, from about 1 micron to about 20 microns, or from about 0.5 microns to about 20 microns. In other aspects, the size of the solid agent may be from about 20 microns to about 5,000 microns, from about 50 microns to about 3,000 microns, or from about 100 microns to about 2,000 microns. The particle size of the solid particulate agent or biocide precursor particulate agent can vary based upon the particular application of the servicing fluid. In some aspects, if the servicing fluid is a drill-in fluid, the particle size of the agent may range from about 0.5 microns to about 20 microns. If the servicing fluid is a fracturing fluid, the particle size of the agent may range from about 1 micron to about 20 microns. If the servicing fluid is a diverting fluid, the particle size of the agent may range from about 20 microns to about 5,000 microns.

One having ordinary skill in the art will understand how to use bridging and filtration theories to size the agents to effectively accomplish the desired fluid flow control. In some aspects of the present disclosure, it may be desirable for the servicing fluid to comprise solid particulate agents or biocide precursor particulate agents having a narrow particle size distribution where the agents have substantially the same particle sizes. In other aspects, it may be desirable for the composition to comprise solid particulate agents or biocide precursor particulate agents having a broad particle size distribution where the agents have a broad range of particle sizes.

The concentration of agents in the servicing fluid can vary. In certain aspects, from about 10 pounds to about 70 pounds, or any sub-range thereof, of the particulate agent or biocide precursor particulate agent may be added per barrel (42 gallon) of servicing fluid. This range may be useful if the servicing fluid is a drill-in fluid. In other aspects, from about 10 pounds to about 150 pounds, or any sub-range thereof, of the agent may be added per 1,000 gallons of servicing fluid. This range may be useful if the servicing fluid is a fracturing fluid or a diverting fluid. In some aspects, there may be up to 4 pounds of the agent per gallon of servicing fluid. The concentration of the particulate agent or biocide precursor particulate agent in the servicing fluid can also be measured as a percentage of the total weight of the servicing fluid. For example, in certain aspects, the amount of the solid particulate agent or solid biocide precursor particulate agent may be from about 0.1 to about 50 percent of the total weight of the servicing fluid. The desired concentration of the agent in the servicing fluid is influenced by the intended use of the fluid.

For example, servicing fluids used for different procedures during completion may require different concentrations of the agent than fluids used during workover, drilling the wellbore, etc. As with sizing, one having ordinary skill in the art can use bridging and filtration theories to determine the suitable concentration for a given application.

The base fluid provided in the servicing fluid will vary greatly with the application of the fluid system. In certain aspects, water may serve as the base fluid. In other aspects, an aqueous based fluid with salts or other soluble materials may be used. The addition of salts to the base fluid may be dictated by the need for formation compatibility and density. The base fluid may also comprise brackish water, seawater, produced water, and any combination thereof. A variety of non-aqueous fluids may also be used as the base fluid. Many different oils, esters, and solvents can be used as the base fluid. Further, gases may be used as the base fluid, such as air, carbon dioxide, and nitrogen. Mixtures of any of the foregoing base fluids may also be employed in the form of foams and/or emulsions (both water external emulsions and water internal emulsions). In certain aspects of the present disclosure, the base fluid or servicing fluid excludes (does not comprise) any "permanent" materials, such as mud, sand, clay, barite, and fly ash. The base fluid should preferably be chosen such that it allows the placement of the particulate agents at the desired location(s) without undue health, safety, environmental, compatibility, or economic considerations.

Depending upon the desired base fluid, particular solid particulate agents or biocide precursor particulate agents can be chosen. Alternatively, if a certain solid particulate agent or solid biocide precursor particulate agent is desired, a suitable base fluid can be chosen. In some aspects, if the agent is highly water soluble, for example, a non-aqueous base fluid can be chosen. In other aspects, if the agent is not water soluble, then an aqueous base fluid may be chosen. In all aspects, any of the presently disclosed solid particulate agents or biocide precursor particulate agents can be used with any of the presently disclosed base fluids.

For example, in some aspects, the servicing fluid may be a drill-in fluid and the base fluid may be an aqueous fluid comprising from about 10% to about 50% sodium chloride. The servicing fluid may also be a fracturing fluid in certain aspects and the base fluid can be an aqueous fluid comprising from about 1% to about 5% of potassium chloride. As an additional illustrative example, the servicing fluid may be a diverting fluid and the base fluid may be an aqueous fluid comprising from about 10% to about 20% hydrochloric acid. Any of the presently disclosed solid particulate agents or biocide precursor particulate agents may be combined with any of the presently disclosed base fluids.

In accordance with certain aspects of the present disclosure, a servicing fluid is prepared using laboratory equipment and procedures well known in the art. Further, one of ordinary skill in the art will appreciate the techniques that may be used to combine the particulate agent or biocide precursor particulate agent with the base fluid to form the servicing fluid. Moreover, various well-known techniques can be employed to inject the fluid into the wellbore and/or the subterranean formation, such as pumping. In some embodiments, after injecting the fluid into the formation, a sufficient amount of time is provided to allow the particulate agent or biocide precursor particulate agent to at least partially bridge/seal a flow path in the wellbore or the formation. After the agent has produced the desired control of fluid flow, it may then be allowed to at least partially degrade to the point where no, or substantially no, residual effect remains on the ability of water or hydrocarbons to flow through the formation.

Upon degradation, the biocide precursor particulate agent produces certain compounds having biocidal properties. In other aspects, after the fluid is pumped into the formation, a bridge/seal may not be formed and instead, a sufficient amount of time will pass to allow degradation, or at least partial degradation, of the biocide precursor particulate agent thereby forming the one or more compounds having biocidal properties.

In some aspects of the present disclosure, the servicing fluid may comprise other components in addition to the base fluid and the particulate agent or biocide precursor particulate agent. For example, the servicing fluid may further comprise any number of other additives commonly used in drilling and/or servicing fluids. In some aspects, water soluble polymers may be added to the servicing fluid for the purpose of adding viscosity, particle suspension, friction reduction, and filtration control. Illustrative examples of water soluble polymers include, but are not limited to, guar, guar derivatives, cellulose derivatives, such as hydroxyethylcellulose, biopolymers such as xanthan, diutan and succinoglycan, polyacrylamide, starch, and polyvinyl alcohol/acetate. Additional polymers used for clay control and relative permeability modifiers may also be added to the servicing fluid.

In certain aspects, the servicing fluid may also comprise additives such as weighting agents, proppants, gravel, surfactants, acids, acid precursors, enzymes, chelating agents, viscosifying agents, microbes, oxidizers, fluid loss agents, pH buffers, friction reducers, biocides, and any combination thereof. Illustrative, non-limiting examples of such additives are as follows: weighting agent may be NaCl; proppant may be sand and/or bauxite; surfactants may be ethoxylated or nonethoxylated surfactants; acid may be HCl; acid precursor may be triethyl citrate; chelating agent may be EDTA; viscosifying agent may be guar; microbe may be *bactillus subtillus*; oxidizer may be sodium persulfate; fluid loss agent may be starch; pH buffer may be sodium carbonate; friction reducer may be polyacrylamide; and the biocide may be glutaraldehyde. An example of an enzyme that may be useful in accordance with the present disclosure is any enzyme that can catalyze the degradation of the solid particulate agent, such as amylase. Suitable enzymes are disclosed in "Isolation of a Strain of *Agrabacterium Tumefaciens* Utilizing Methylene Urea as a Nitrogen Source," Can. J. Microbiol. 50: 167-274, 2004, the disclosure of which is incorporated into the present application in its entirety.

The servicing fluid may further comprise fillers or coatings when desired. The fillers can be used for any purpose, and illustrative examples include cost reduction, improved strength, density control, and chemical release modification. In certain aspects, the coating may control degradation, improve storage, modify chemical release properties, consolidate the agents, or make them tacky.

The servicing fluid disclosed herein can be any fluid used for any application in the oil field. For example, in certain aspects, the servicing fluid is a drilling fluid used during the drilling phase of the well. In this aspect, for example, the fluid may be employed when drilling the wellbore. Alternatively, the fluid can be used in applications during well workover, completion, production, injection, and/or stimulation. During these phases, the servicing fluid may be used as, for example, a fluid loss pill, a diverting fluid, a fracturing fluid, a gravel packing fluid, an acidizing conformance fluid, or a completion fluid.

In some aspects, such as during a fracturing treatment, a second servicing fluid may be injected into the subterranean formation. The second servicing fluid may comprise any of the presently disclosed base fluids and a proppant. In this aspect, the conductivity of the proppant may increase in the formation, thereby forming one or more conductive flow channels in the formation.

In certain aspects of the present disclosure, the particulate agent or biocide precursor particulate agent forms a particulate bridge, a filter cake, a plug, a pack, a temporary permeability reduction, or a seal in the formation, thereby influencing a flow path of the servicing fluid or any additional fluids that are subsequently introduced into the formation. The agent can influence the flow path in a variety of ways, such as diverting the fluid, reducing leakoff, reducing lost circulation, and preventing or reducing flow of the fluid through a particular area of the formation. The permeability reduction can take place in the formation itself or in a particulate pack where the particulate pack can be a fracture or gravel pack. Diverting of the fluids can be advantageous during, for example, the placement of an acid treatment in the formation or any other chemical stimulation treatments or damage removal treatments. Forming a seal in the formation can be advantageous to reduce lost circulation where the circulation is lost due to, for example, fractures, vugs, pores, or other permeable zones in the formation.

In one aspect, the present disclosure provides a method for treating a subterranean formation. Initially, a servicing fluid is prepared comprising a base fluid and a solid particulate agent or a solid biocide precursor particulate agent suspended therein. The solid agent is the reaction product of a urea containing compound and an aldehyde containing compound. The base fluid can be any base fluid, or a mixture of any base fluids, disclosed herein. The servicing fluid is then introduced into the subterranean formation by pumping or any other known method. The solid agent, or at least a portion of the solid agent, is then allowed to seal a flow path in the subterranean formation. Finally, at least a portion of the solid agent is then allowed to degrade and, in some aspects, thereby forms one or more compounds having biocidal properties. In some aspects, degradation is accomplished through hydrolysis of the agent with water in the formation.

In another aspect, the present disclosure provides a method for treating a subterranean formation having a pre-existing wellbore. In this aspect, a wellbore is defined as a drilled hole or channel used to provide access to a subterranean formation. Thus, in this aspect, the subterranean formation has a pre-existing wellbore, meaning that it already includes a wellbore. Initially, a servicing fluid is prepared comprising a base fluid and a particulate agent or biocide precursor particulate agent. The agent may be a solid particulate agent or a solid biocide precursor particulate agent suspended in the base fluid or partially dissolved and partially suspended in the base fluid. The agent is the reaction product of a urea containing compound and an aldehyde containing compound. The base fluid can be any base fluid, or a mixture of any base fluids, disclosed herein. The servicing fluid is then introduced into the subterranean formation by pumping or any other known method. The agent, or at least a portion of the agent, is then allowed to seal a flow path in the subterranean formation. Finally, at least a portion of the agent is then allowed to degrade and, in some aspects, thereby forms one or more compounds having biocidal properties. In some aspects, degradation is accomplished through hydrolysis of the agent with water in the formation.

EXPERIMENTAL EXAMPLES

Example 1

Table 1 shows the degradation rate of isobutylidene diurea (IBDU). Fresh water (50 mL) was added to an 8 oz. jar. The IBDU was added at 0.5 g and the jar was sealed with a lid. The average diameter of each IBDU particle was about 2.25 mm. The jar was placed in a 200° F. oven. The relative amount (vol. %) is noted at the intervals given in the table.

TABLE 1

| IBDU at 200° F. | |
| --- | --- |
| Day | Vol. % Remaining |
| 0 | 100 |
| 2 | 10 |
| 10 | <2 |

Example 2

Table 2 shows the degradation rate of a methylene urea compound. The compound was a long chain methylene urea polymer with greater than six homologues and average particle sizes of about 2.25 mm. Such a compound is commercially available under the name Nitroform™ from Agrium Advanced Technologies, located at 2915 Rocky Mountain Ave., Suite 400, Loveland, Colo., 80538. Fresh water (50 mL) was added to an 8 oz. jar. The Nitroform™ was added at 0.5 g and the jar was placed into a pressurized cell. The cell is placed in a 250° F. oven. The relative amount (vol. %) is noted at the intervals given in the table.

TABLE 2

| Nitroform ™ at 250° F. | |
| --- | --- |
| Day | Vol. % Remaining |
| 0 | 100 |
| 2 | 90 |
| 7 | 10 |
| 15 | 0 |

As can be seen in the tables, at 2 days, 90% of the IBDU has degraded (10% remaining) at 200° F. However, at 2 days, only 10% of the Nitroform™ has degraded (90% remaining) and the temperature used in connection with the Nitroform™ experiment was higher. As such, when comparing different reaction products of urea and an aldehyde (for example, Nitroform™ compared to IBDU), significantly different degradation properties are seen. Therefore, particular reaction products can be chosen based upon the intended application of the servicing fluid.

Example 3

Two different types of test media vials were used in the present example. The test media was ordered from Biotechnology Solutions, LLC, 12664 Goar Road, Houston, Tex., 77077. The test media were as follows: 1% Phenol Red Dextrose P-3536 (pH reducing bacteria indicator, PRB) and 1% Modified Postgates' BM-3397 (sulfate reducing bacteria indicator, SRB).

The biocide precursor particulate agent prepared for this test was 1 gram of IBDU in 100 mL of bottled water, degraded at 160° F. for 1 month. This is the recommended dosage rate used in step 4 of the Biocide Test Procedure.

Water Sample Preparation

The bacteria-containing water sample for the below test procedure was prepared using the following steps:
1. Collect a sample of pond water.
2. Pull 0.5 mL of pond water from sample and inoculate a PRB medial file using a syringe with needle.
3. Using a new syringe, pull 0.5 mL of pond water from sample and inoculate a SRB media vial.
4. Place both vials in an incubator at 37° C. until color change is complete.
5. Pull 1 mL from each vial and add to 200 mL of bottled water (chlorine free).
6. Split samples up into 100 mL samples.

The following steps were used to carry out the biocide test procedure:
1. Collect water sample known to contain bacteria or suspected of containing bacteria.
2. For each biocide material to be tested, make up the following recipe (test samples)
   a. 100 mL of clean, chlorine free water
   b. 0.5 mL of the sample water
3. Make up one additional test sample of the recipe in Step 2 as a control.
4. Add biocide precursor to test samples from Step 2 at the recommended dosage rate.
5. Record contact time for bactericide (1 or 24 hours as examples).
6. A series dilution test will be performed for each test sample from Steps 3 and 4.
   a. Use 6 media vials each of the pH indicator and the iron reduction indicator for the series dilution testing for each biocide test sample and for the control test sample (test control first).
   b. Extract a 1.0 mL aliquot from each test sample.
   c. Inject the 1.0 mL aliquot from step b, into the first test media vial of a series.
   d. Mix test media vial thoroughly.
   e. Extract 1.0 mL aliquot from first test vial media.
   f. Inject the 1.0 mL aliquot taken from the first vial to the second vial.
   g. Mix second vial thoroughly.
   h. Extract 1.0 mL aliquot from second test media vial.
   i. Inject the 1.0 mL aliquot taken from the second vial to the third vial.
   j. Continue this dilution method until all vials have been inoculated.
   k. After inoculating the last vial, extract 1.0 mL and discard.
7. Incubate test vials for 72 hours at 98.6° F.
8. Results are determined by color change. To interpret the results, use Table 1 in NACE Standard TM0194-2004, Item No. 21224.

Representative data from these tests can be seen below in Table 3. IBDU was compared to a known biocide, gluteraldehyde. 1 gram of IBDU/100 mL of DI water was used as well as 1.2 µL gluteraldehyde/100 mL DI water.

TABLE 3

| Sample | SRB (Count/mL Remaining) | | PRB (Count/mLRemaining) | |
| --- | --- | --- | --- | --- |
| | 1 Hour | 24 Hour | 1 Hour | 24 Hour |
| Control | ≥1,000,000 | ≥1,000,000 | ≥1,000,000 | ≥1,000,000 |
| IBDU | 100 | 100 | 100 | 0 |
| Gluteraldehyde | 1000 | 10 | 100,000 | 1,000 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a particulate agent" is intended to include "at least one particulate agent" or "one or more particulate agents."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A servicing fluid comprising:
    a base fluid and a solid particulate agent,
    wherein the base fluid is selected from the group consisting of water, an aqueous fluid comprising salt, an oil, an ester, a non-aqueous solvent, a gas, and any combination thereof, and
    wherein the solid particulate agent is selected from the group consisting of monomethylol urea, methylene diurea, dimethylene triurea, trimethylene tetraurea, isobutylidene diurea, crotonylidene diurea, and any combination thereof; and
    wherein the solid particulate agent has a particle size ranging from about 0.1 microns to about 5,000 microns.

2. The servicing fluid of claim 1, wherein the solid particulate agent is selected from the group consisting of monomethylol urea, methylene diurea, dimethylene triurea, trimethylene tetraurea, crotonylidene diurea, and any combination thereof.

3. The servicing fluid of claim 1, further comprising from about 0.5 to about 50 percent by weight of the solid particulate agent.

4. The servicing fluid of claim 1, wherein the solid particulate agent has a particle size ranging from about 3,000 microns to about 5,000 microns.

5. The servicing fluid of claim 1, further comprising a proppant or sand.

6. The servicing fluid of claim 1, wherein the servicing fluid is a member selected from the group consisting of a drilling fluid, a fluid loss pill, a lost circulation pill, a diverting fluid, a bridging fluid, a plugging fluid, an abrasive cutting fluid, a scouring fluid, a perforating fluid, a fracturing fluid, a gravel packing fluid, a acidizing fluid, a conformance fluid, and a completion fluid.

7. The servicing fluid of claim 1, further comprising a member selected from the group consisting of a filler, a coating, a water soluble polymer, a weighting agent, a proppant, gravel, a viscosifying agent, a surfactant, an acid, an acid precursors, an enzyme, a chelating agent, a microbe, an oxidizer, a fluid loss agent, a pH buffer, a friction reducer, a biocide, and any combination thereof.

\* \* \* \* \*